US009450231B2

(12) United States Patent
Madray et al.

(10) Patent No.: US 9,450,231 B2
(45) Date of Patent: Sep. 20, 2016

(54) METHOD FOR PREPARING A POSITIVE ELECTRODE MATERIAL THROUGH EXTRUSION IN PRESENCE OF AN AQUEOUS SOLVENT, POSITIVE ELECTRODE OBTAINED THROUGH SAID METHOD, AND USES THEREOF

(75) Inventors: Sophie Madray, Quimper (FR); Marc Deschamps, Quimper (FR); Stéphane Kerdranvat, Quimper (FR)

(73) Assignee: BLUE SOLUTIONS (FR)

( * ) Notice: Subject to any disclaimer, the term of this patent is extended or adjusted under 35 U.S.C. 154(b) by 137 days.

(21) Appl. No.: 13/389,286

(22) PCT Filed: Sep. 8, 2010

(86) PCT No.: PCT/FR2010/051871
§ 371 (c)(1),
(2), (4) Date: Apr. 19, 2012

(87) PCT Pub. No.: WO2011/030058
PCT Pub. Date: Mar. 17, 2011

(65) Prior Publication Data
US 2012/0202114 A1    Aug. 9, 2012

(30) Foreign Application Priority Data
Sep. 9, 2009  (FR) ..................... 09 56168

(51) Int. Cl.
*H01M 4/136* (2010.01)
*H01M 4/04* (2006.01)
(Continued)

(52) U.S. Cl.
CPC ........... *H01M 4/136* (2013.01); *H01M 4/0404* (2013.01); *H01M 4/0411* (2013.01);
(Continued)

(58) Field of Classification Search
None
See application file for complete search history.

(56) References Cited

U.S. PATENT DOCUMENTS

2003/0205835 A1\* 11/2003 Eastin et al. ................. 264/104
2004/0130061 A1\*  7/2004 Lavoie et al. ............ 264/211.21
(Continued)

FOREIGN PATENT DOCUMENTS

| FR | WO 2006/082172 | \* | 8/2006 | .............. H01G 9/58 |
| JP | 58160130 | \* | 9/1983 | ................ B29F 3/00 |

(Continued)

OTHER PUBLICATIONS

Abstract for JP 58160130.\*
(Continued)

*Primary Examiner* — Yoshitoshi Takeuchi
(74) *Attorney, Agent, or Firm* — Sofer & Haroun, LLP (57) ABSTRACT

The present invention relates to a method for preparing a positive electrode that is made up of a composite material containing at least one active positive electrode made of iron and phosphate and at least one water-soluble polymer having ionic conduction properties in the presence of a lithium salt, said method comprising at least one step for mixing ingredients of the composite material through extrusion so as to obtain an extruded composite material and wherein said extrusion step is carried out by means of a co-kneader or extruder in the presence of an aqueous solvent and at a temperature from 20° to 95° C. The invention also relates to the positive electrode obtained according to said method, to the use of said electrode for manufacturing a lithium battery, and to the lithium battery having such electrode built therein. The electrode is particularly characterized in that it contains a level of active material greater than 60 wt %.

30 Claims, 1 Drawing Sheet

(51) Int. Cl.
*H01M 4/1397* (2010.01)
*H01M 4/86* (2006.01)

(52) U.S. Cl.
CPC ......... *H01M4/0435* (2013.01); *H01M 4/1397* (2013.01); *H01M 4/8657* (2013.01); *Y02E 60/122* (2013.01); *Y10T 29/49108* (2015.01)

(56) References Cited

U.S. PATENT DOCUMENTS

2004/0188880 A1   9/2004  Bauer et al.
2006/0166093 A1*  7/2006  Zaghib et al. ............... 429/217
2009/0226635 A1*  9/2009  Leblanc et al. ............... 427/557
2011/0128666 A1*  6/2011  Drevet et al. ................. 361/305

FOREIGN PATENT DOCUMENTS

WO      03075375       9/2003
WO      2004045007     5/2004

OTHER PUBLICATIONS

Hensen, Plastic Extrusion Technology 2nd Ed., Hanser/Gardner Publications, Inc. (1997).*
International Search Report dated Jan. 19, 2011.

* cited by examiner

METHOD FOR PREPARING A POSITIVE ELECTRODE MATERIAL THROUGH EXTRUSION IN PRESENCE OF AN AQUEOUS SOLVENT, POSITIVE ELECTRODE OBTAINED THROUGH SAID METHOD, AND USES THEREOF

RELATED APPLICATIONS

This application is a National Phase application of PCT/FR2010/051871, filed on Sep. 8, 2010, which in turn claims the benefit of priority from French Patent Application No. 09 56168 filed on Sep. 9, 2009, the entirety of which are incorporated herein by reference.

BACKGROUND

1. Field of the Invention

The present invention relates to a process for producing a composite for use as a positive electrode, based on iron phosphate and in particular $LiFePO_4$, via extrusion in the presence of water or a mixture of water and at least one water-miscible solvent, to the positive electrode obtained by implementing this process and to its applications.

2. Description of Related Art

The invention relates to the field of manufacturing lithium metal polymer (LMP) batteries. This type of battery takes the form of a set of thin films rolled up n times (rolls of the following structure: electrolyte/cathode/collector/cathode/electrolyte/lithium) or of multilayers of n thin films (cut and superposed, or n multilayers of the aforementioned configuration). This unitary stacked/complexed configuration has a thickness of about one hundred microns. It comprises 4 functional sheets: i) a negative electrode (anode) generally consisting of a lithium-metal or lithium-alloy foil, ii) an electrolyte composed of a polymer (generally polyoxyethylene (POE)) and lithium salts, iii) a positive electrode (cathode) composed of an active electrode material based on metal oxide (for example $V_2O_5$, $LiV_3O_8$, $LiCoO_2$, $LiNiO_2$, $LiMn_2O_4$ and $LiNi_{0.5}Mn_{0.5}O_2$ etc.) or based on a phosphate of the $LiMPO_4$ type where M represents a metal cation selected from Fe, Mn, Co, Ni and Ti or combinations of these cations, such as for example $LiFePO_4$, on carbon and on a polymer, and finally iv) a current collector generally consisting of a metal foil and enabling electrical connection.

Processes for producing thin cathode films for lithium batteries generally consist in mixing the active electrode material, which is commonly in powder form, with an electrically conductive material, such as carbon or graphite particles or a mixture of the two, and a polymer binder in an organic solvent to form a homogenous paste. This paste is then applied to a current collector to form a thin film and then the organic solvent is evaporated by heating. The electrode film obtained by these processes is generally porous and contains no electrolyte. This thin cathode film is then joined with the other elements of the battery and then the assembly is saturated with an ionically conductive liquid electrolyte comprising a lithium salt. The porous film forming the cathode is then filled with the electrolyte so as to enable ion exchange between the cathode and the anode.

Other processes for producing thin films of positive-electrode material for solid-state lithium (LMP) batteries employ a mixture incorporating an electrolyte consisting of a solvating polymer and a lithium salt. The mixture comprises the active-electrode material in particle form, the electrically conductive material, the solvating polymer and the lithium salt mixed in an organic solvent to form a homogenous electrode paste. This paste is then applied to a current collector to form a film or thin film, and then the organic solvent is evaporated by heating so as to form the electrode. The positive electrode obtained in this way has a low porosity insofar as the electrolyte is initially introduced into the electrode material before evaporation of the solvent and fills the spaces between the particles of active-electrode material. This positive-electrode film is then joined with a solid ionically conductive separator (polymer electrolyte) and a negative counter electrode in order to form the solid lithium battery.

In both cases, organic solvents are used to reduce the viscosity of the mixture used to manufacture the cathode and allow the electrode paste to be applied to the current collector in the form of a thin film. The organic solvents must then be removed, most often by evaporation after heating, before the various components of the battery are joined together. When this type of electrode is manufactured on an industrial scale or by a continuous process, the evaporated organic solvents must be recovered so as not to pollute the environment. Processes for recovering organic solvents require special facilities to prevent solvent vapor from escaping into the environment, and equipment suited to storing and handling these solvents in large amounts during their use.

Replacing the organic solvents used in these processes with a nonpolluting solvent such as water has already been envisioned, especially in international application WO 2004/045007. According to this process, a support is coated with an aqueous solution containing an active positive-electrode material and a binder consisting of a water-soluble synthetic rubber mixed with a thickening agent. It is then necessary to dry the deposited film on the support for a time of at least 12 to 24 hours so as to reduce the water content down to a value lower than 2000 ppm and preferably lower than 50 ppm. It is not possible to incorporate lithium salts into this solution insofar as these salts, due to their hygroscopic properties, would retain water present in the film and further increase the time required by the drying step to remove the water after coating the aqueous solution on the support. In this case, the film obtained is therefore porous so as to allow it to be subsequently impregnated with a lithium salt during assembly with the other components of the battery and enable ion exchange between the cathode and the anode. The process described in international application WO2004/045007 can therefore not be used to produce lithium-based batteries which require the lithium salt to be incorporated into the positive-electrode material before it is joined with the other components of the battery.

It is also possible to produce positive electrodes by dry (solventless) extrusion. In this case, the various components of the composition of the electrode material are introduced into a single-screw or twin-screw extruder and then extruded through a flat die onto a support. The mixture of the various components of the electrode material however has a high viscosity, thereby generally limiting the content of active electrode material that it is possible to incorporate. Thus, in the case where $LiFePO_4$ is used as active positive-electrode material, the maximum percentage that can be incorporated into the final electrode material is about 65%, more commonly lower than 60% of the total dry weight of the electrode. It is generally not possible, in this respect, to raise the temperature to decrease the viscosity of the system during the extrusion because of the very nature of the polymer used (a polyether), which is sensitive to heat and would be degraded. Moreover, the primary obtained, generally a few hundred microns in thickness, must be rolled or calendered to obtain an electrode film a few tens of microns in thickness, generally ≤65 μm in thickness depending on the applications targeted. This rolling or calendering step cannot generally be carried out directly on the current collector because the compressive and shear stresses related to the viscosity are too great and most often cause the current collector to break (aluminum collector <30 μm in thickness). It is therefore necessary, in a first step, to produce the electrode material and to then continue with an additional step called a complexing step (thermocompression bonding of the cathode to the collector) during which step the material is joined to the current collector. In this context of "stepped" complexing, it is generally more difficult to obtain an optimal quality for the interface between the electrode material and the current collector, whereas in the case of direct rolling or calendering of the electrode material extruded onto the current collector, the rolling or calendering stresses, in addition to their thickness sizing function, strengthen the adhesion of the electrode film to the surface of the collector and thus create a better-quality interface, increasing the homogeneity and quality of electron exchange within the battery.

OBJECTS AND SUMMARY

There is therefore a need for a process for producing a positive-electrode material based on iron phosphate, and in particular based on $LeFePO_4$, that makes it possible:
  to obtain cathodes having a high active-material content, generally higher than 60%, preferably higher than 70%, while minimizing their porosity;
  to deposit the cathode material directly on the current collector, without requiring a complexing step;
  to obtain cathode films having a thickness smaller than 100 μm, preferably smaller than 65 μm;
  to obtain quality films (homogenous, tow-porosity films, as mentioned above, having a uniform thickness profile over the entire width without thinning at the edges and providing good electrochemical performance); and
  to allow, when so desired, lithium salts to be incorporated into the mixture of electrode constituents before the electrode is joined to the other components of the battery.

One subject of the present invention is therefore a process for producing a positive electrode consisting of a composite comprising the following ingredients:
  at least one active positive-electrode material chosen from iron-phosphate-based materials;
  at least one water-soluble polymer that conducts ions in the presence of a lithium salt; and
  optionally at least one material providing electrical conduction properties,
said process comprising at least one step of mixing, by extrusion, the ingredients of the composite so as to obtain an extruded composite, at least one step of forming the composite extruded through a die, at least one step of rolling or calendering the extruded composite into the form of a positive-electrode film on a current collector, and at least one step of drying the positive--electrode film applied to the current collector,
  said process being characterized in that the extrusion step is carried out by means of a co-kneader, a twin-screw extruder or a multi-screw extruder (number of screws >2) in the presence of an aqueous solvent consisting of demineralized or distilled water or of a mixture of demineralized or distilled water and at least one water-miscible solvent representing at most 30 wt % of the total weight of the aqueous solvent, said aqueous solvent representing approximately from 3 to 25 wt % of the total weight of the ingredients forming the composite, and at a temperature from 20 to 95° C.

The process according to the invention has the following advantages:
  the aqueous solvent is used as an additive to make extrusion easier by acting as a plasticizer that lowers the viscosity of the mixture without requiring a temperature increase, thereby permitting a tow extrusion temperature compatible with the use of heat-sensitive polymers (extrusion temperature of 20 to 95° C.);
  the modular nature of the screw profile, of the temperature profile and of the supply configurations make it possible to employ various formulations and select/refine the properties of the cathode;
  reducing the viscosity and the extrusion temperature limits the mechanical and thermal stresses customarily exerted in dry extrusion in order to melt the material and coat the feedstock; consequently, it is not absolutely necessary to add antioxidants to the positive-electrode composite; and
  it makes it possible to obtain cathodes having a high active-material content, in general higher than 60%, preferably higher than 70%, while limiting their porosity and to obtain cathode films having a thickness smaller than 100 μm, preferably smaller than 65 μm.

Compared to processes for producing electrode materials by dry extrusion, the process according to the invention has the following advantages:
  the stresses generated by dry extrusion generally act to degrade the polymer, which may, in addition, generate pollutants that are liable to interfere, in fine, with the electrochemistry;
  the mixing step, in the extruding equipment, is carried out in line with the step of rolling or calendering the composite extruded on the current collector;
  direct rolling or calendering of the material extruded on the current collector ensures cohesion and a high-quality interface. The process according to the invention permits the rolling or calendering of a cathode film <65 μm in thickness on a current collector for example consisting of an aluminum substrate about fifteen microns in thickness. By modulating the viscosity, it is possible to roll or calendar a cathode film on aluminum substrates having a thickness of ≤12 μm; and
  the low viscosity of the mixture of ingredients forming the extruded composite makes clearing of the die at the outlet of the extruder, then rolling or calendering in line, easier and allows a cathode film having a stable width to be directly obtained. Thus, the process according to the invention makes it possible to manufacture cathodes more than 700 mm in width without trimming being necessary to obtain a constant-width film.

Therefore, the wet process according to the invention consumes less power, causes less wear to the equipment and is less "disruptive" regarding the polymer and the electrochemistry.

The extrusion step is preferably carried out at a temperature from 35 to 80° C.

According to one preferred embodiment of the invention, the extrusion step is carried out by means of a twin-screw extruder.

The twin-screw extruder possibly used according to the process of the invention is preferably a corotating twin-screw extruder.

In this case, the twin-screw extruder possibly used in the process preferably comprises a sectional, modular barrel consisting of about ten blocks in succession, each block being individually controlled to a specific selected temperature and in which blocks two parallel screws rotate, a variable-speed gearmotor driving the screws, one or more variable feed rate supply devices (weigh or volume feeders) intended to supply the extruder with the ingredients making up the composition of the electrode composite, a system for introducing the liquid aqueous solvent (gravimetric device or liquid injection pump dedicated to introducing the aqueous solvent into the extruder), and optionally one or more side feeders for supplying the ingredients to the twin-screw chamber. The twin-screw extruder is furthermore equipped with various hoppers (for the aforementioned feeders and supply devices), with one or more specific barrel assemblies dedicated to the optional connection of one or more liquid injection nozzles, and optionally with one or more barrel assemblies intended to receive the one or more connections of a side feeder. These various modular devices can be placed along the twin-screw, depending on the configuration chosen. Because it is possible to dedicate a feeder to each ingredient of the composition of the mixture to be extruded, it is possible to use either granules or powder depending on the type of feeder selected.

The twin-screw extruder ensures that the various ingredients are mixed, with a view to obtaining a homogenous paste, by combining shear stresses, applied to the ingredients, and dispersive and distributive mixing. The quality of the final mixture essentially depends on the elements forming the screw profile, especially the kneaders, on the fill level, and on the shear rates involved. In parallel, reducing the viscosity obtained by adding water makes it possible to limit the mechanical and thermal stresses on the polymer matrix while passing through the various kneader blades, and therefore to prevent self-heating that is likely to degrade the one or more heat-sensitive water-soluble polymers. The shear stress and the dispersive/distributive mixing are modulated by the twin-screw elements and by their nature, number, state and arrangement along the screw. It is mainly the type of kneaders chosen (single lobe, double lobe, triple lobe, etc.), the lobe width (apex of the lobe on which the shear forces act), the angle between the axis of the lobes of 2 successive kneading elements (which is adjustable depending on the dispersive/distributive effect desired), and the distribution of these kneaders along the screw that may be used to adjust the quality of the mixture for a given supply configuration. Special elements such as reverse steps or crenellated lobes can also be employed to optimize the mixture depending on the formulation, on the properties of the polymer, on the type and structure of the fillers, and on the final properties desired.

The invention may be applied to small laboratory-type twin-screw extruders (for example extruders of 18 mm diameter) and to industrial extruders the diameter of which may be greater than 200 mm. These extruders generally have a length (L)-to-diameter (D) ratio (L/D) of between 25 and 55 and comprise about ten zones (generally from 7 to 13 zones).

Among the water-miscible solvents that can optionally be used in the aqueous solvent, mention may be made of glycols and lower alcohols such as methanol, ethanol, propanol and butanol. Among such solvents, ethanol is preferred.

When it is present, the water-miscible solvent preferably represents less than 15 wt % of the total weight of the aqueous solvent.

According to another preferred embodiment of the invention, the amount of aqueous solvent used in the extrusion step varies approximately from 8 to 15 wt % of the total weight of the ingredients forming the composite.

If it is desired to modulate the mixing parameters it is possible to introduce the aqueous solvent into the extruder either at a number of points or in a number of separate zones. A first mixing substep may be carried out on a still relatively viscous paste, so as to intensify the dispersive and distributive mixing; other successive introduction substeps can then be carried out, thereby allowing the viscosity to be gradually lowered so as to continue gently mixing the mixture. Generally, it is possible to modulate the viscosity of the cathode paste depending on the process, the formulation and the desired properties, by varying the percentage amount of aqueous solvent introduced into the twin-screw.

For typical mixtures tested at a temperature of 70° C., viscosities are about 500 to 1000 Pa·s for a shear rate of about 500 $s^{-1}$, 100 to 500 Pa·s for a shear rate of about 1000 $s^{-1}$ generally less than 250 Pa·s for a shear rate >2000 $s^{-1}$ (which reveals thixotropic behavior, in other words the viscosity decreases with the shear rate). These viscosity measurements were carried out using an RH 2200® twin-bore capillary rheometer, sold by Rosand, which allowed Bagley and Rabinowitch corrections to be incorporated.

Introduction of the aqueous solution in a defined amount may also be carried out gravimetrically in the one or more suitable zones of the extruder.

According to another preferred embodiment of the invention, a device for increasing and stabilizing the pressure is positioned at the outlet of the extruder, in front of the die in order to ensure that the die is cleared and that a uniform primary is obtained. By way of such devices, mention may be made for example of single-screw rework extruders and gear extrusion pumps (melt pumps).

According to another embodiment of the invention, a single-screw rework extruder is used having a temperature profile of 20 to 95° C. The rotation speed will be set depending on the feed rate and the size of the single-screw, according to the general knowledge of a person skilled in the art.

Next, a die, generally cylindrical or flat, placed downstream of the device for increasing and stabilizing the pressure at the end of the extrusion line, presents the extrudate to the input of the rolling or calendering device. According to the present invention, a flat die is preferably used, the shape of which resembles the geometry of the final product (positive electrode) and promotes production of a stable width.

The extrudate exiting the die is then rolled or calendered on the current collector. To solve the possible problem of bonding of the cathode to the rollers, it is possible to use a protective film that runs at the rolling or calendering speed (for example a polypropylene (PP) or polyethylene terephthalate (PET) film or plastic films having nonstick properties). This film is then removed before the drying operation. It is possible to recycle this film a number of times because it is not mechanically and thermally stressed to a great extent during the rolling or calendering step. An alternative solution consists in using a nonstick belt that runs on the roller in contact with the extrudate. It is also possible to use rollers made of a nonstick material or employing nonstick coatings compatible with the surface finish desired for the final product.

In another preferred embodiment of the invention, the die is located near the rolling system. The extrudate or primary a few hundred microns in thickness is rolled or calendered to the thickness required to obtain the target thickness once the composite is dried. It is possible to adjust the temperature, gap and pressing force of the rolling or calendering equipment.

According to another preferred embodiment of the invention, the rolling or calendering step is carried out in rolling or calendering equipment consisting of two rollers that rotate in opposite directions. The temperature of each roller may be individually controlled in a range from 15 to 95° C. The linear speed depends on the feed rate of the input material and on the width and thickness of the targeted product. Optimization of the distance between the die and the rolling or calendering equipment makes it possible to control the introduction of the extrudate between the rollers and to stabilize the final width.

In another preferred embodiment of the invention, the residence time of the water in the composite is minimized, especially so as to prevent degradation of the active iron-phosphate-based material. It is also necessary to minimize the residence time of the water when the undried extruded composite is in contact with the current collector so as to prevent certain corrosion effects likely to occur in the presence of water on certain collectors depending on their coating. This is why the drying step is preferably carried out in line, in order to preserve the integrity of the product and to optimize its quality but also to meet industrial throughput requirements.

According to the process in accordance with the invention, the various ingredients forming the composite are added directly to the extruder (it is not necessary to make particular preparations or to prepare mixtures beforehand).

The ingredients of the composition of the electrode composite may then be introduced into the extruder in the form of a mixture contained in a single weigh or volume feeder or else distributed, singly or in groups, in different weigh or volume feeders placed in series relative to one another. Alternatively to gravimetric supply, it is also possible to connect one or more of these feeders to one or more side feeders secured to the extruder and allowing the one or more desired raw materials to be delivered to the extruder. This type of arrangement is widely used in extrusion to ensure the uniform introduction of products that are possibly difficult to supply gravimetrically.

According to another preferred embodiment of the invention, the active positive-electrode material, the water-soluble polymer and the material providing electrical conduction properties are each contained in different feeders and introduced, in succession and/or simultaneously, into various selected zones of the extruder, downstream or upstream of the zone for introducing the aqueous solvent.

The introduction of the aqueous solvent in a defined amount can be carried out gravimetrically in the one or more suitable zones of the extruder. The aqueous solvent is preferably injected directly into the extruder, by means of a liquid injection pump.

According to another preferred embodiment of the invention, the extrusion is carried out at a feed rate of 2 to 200 kg of the mixture of the ingredients (solid content) of the composition of the electrode material per hour. Thus, and by way of example, for a feed rate of solid ingredients of 100 kg/h to which about 12 wt % of aqueous solvent is added, the total feed rate (solid ingredients+aqueous solvent) is then about 113.6 kg/h.

The active electrode material is preferably $LiFePO_4$ in the form of uncoated particles or particles comprising a carbonaceous coating. In the latter case, it is not necessary to add a material providing electrical conduction properties to the mixture of ingredients of the composition of the composite, or a smaller amount is required, because of the presence of carbon on the surface of the $LiFePO_4$ particles.

The active electrode material preferably represents approximately from 60 to 85 wt %, and more preferably approximately from 70 to 80 wt %, of the total weight of the ingredients of the composition of the composite in the solid state.

The water-soluble polymer possibly used according to the invention preferably takes the form of a powder, of granules or of an aqueous dispersion. It is preferably chosen from polyethers such as polyoxyethylene (POE), polyoxypropylene and polyoxybutylene polymers, copolymers and terpolymers.

This polymer preferably represents approximately from 10 to 30 wt %, and more preferably approximately from 15 to 25 wt %, of the total weight of the ingredients of the composition of the composite in the solid state.

The material providing electrical conduction properties is possibly carbon, preferably chosen from carbon blacks, such as acetylene black or high-specific-surface-area carbon blacks, such as the products sold under the name Ketjenblack® EC-600M by AkzoNobel, carbon nanotubes, graphite or mixtures of these materials. It may be an aqueous dispersion of carbon black or of graphite such as the product sold under the trade name Electrodag® EB-012 by Acheson.

According to the invention, the material providing electrical conduction properties preferably represents approximately from 0 to 10 wt % when low-specific-surface-area carbons are used (by way of indication, specific surface areas below 200 $m^2/g$) or approximately between 0 and 2.5 wt % when high-specific-surface-area carbons are used (by way of indication, specific surface areas above 1000 $m^2/g$), said percentages being expressed relative to the total weight of the ingredients of the composition of the composite in the solid state. The percentage of carbon is modulated as a function of the amount of carbon already optionally incorporated in the $LiFePO_4$ particles. The use of $LiFePO_4$ particles sufficiently coated with carbon makes it possible to obviate the need to add a carbonaceous filler. In contrast, the use of bare $LiFePO_4$ particles generally means that a conductive material must be incorporated.

To function electrochemically, the positive-electrode composite must contain at least one material providing ionic conduction properties. This material may be a lithium salt especially chosen from $LiAlCl_4$, $Li_2Al_2Cl_6O$, $LiClO_4$, $LiPF_6$, $LiAsF_6$, $LiBF_4$, $LiCF_3SO_3$, $LiSbF_6$, $LiSbCl_6$, $Li_2TiCl_6$, $Li_2SeCl_6$, $Li_2B_{10}Cl_{10}$, $Li_2B_{12}Cl_{12}$, LiBOB, LiBETI, LiFSI, and LiTFSI.

The final content of lithium salt preferably varies approximately from 3 to 10 wt %, more preferably approximately from 4 to 8 wt %, of the total weight of the electrode composite after drying of the film.

According to a first variant of the invention, the lithium salt is added to the ingredients of the composition of the electrode composite in the extrusion step. In this case, it is a nonhydrolyzable water-soluble salt (counterion stable in water), such as, LiTFSI, $LiClO_4$ or LiBETI.

According to one particular preferred embodiment of the process of the invention, the aqueous solvent used in the extrusion step then contains said lithium salt in solution. Using an aqueous solvent comprising a lithium salt has the advantage of limiting the drawbacks associated with handling powdered salt (risks of contamination and formation of an adhesive/deliquescent product in a non-anhydrous atmosphere).

According to a second variant of the invention, the lithium salt is incorporated into the electrode composite a posteriori, i.e. after the step of drying the film, by diffusing from an electrolyte after the latter has been brought into contact with the surface of the electrode film.

According to the invention, the rolling or calendering step is carried out directly on at least one of the two faces of a current collector, via action on the composite extruded as outlet from the die. This rolling or calendering step is preferably carried out at a temperature from 20 to 95° C., and more preferably from 30 to 70° C.

The composite film applied to the current collector preferably has a thickness of about 100 μm or less, and more preferably of about 65 μm or less.

The current collector for the positive electrode generally consists of an aluminum foil having a thickness ranging from 4 μm to 30 μm, preferably from 5 to 15 μm, furthermore possessing protective anticorrosion layers on each of the faces making contact with the electrode composite, so as to prevent any chemical reaction on contact with its constituents, especially with the lithium salt, whether the latter is one of the ingredients introduced into the twin-screw of the extruder or whether it is added subsequently during assembly of the various components of the battery. This protective anticorrosion layer may for example consist of an electrically conductive lacquer that is chemically inert with respect to the components of the cathode, or else a coating that is chemically inert with respect to the components of the cathode, such as for example a gold layer or a titanium nitride layer.

The step of drying the film applied to the current collector is preferably carried out in line. It has the aim of removing the water used in the extrusion step present in the film. Various film-drying techniques conventionally used in the field and well known to those skilled in the art may be employed, optionally in combination, in the drying step. Among such techniques, mention may especially be made of conductive, convective and radiative heating.

According to one preferred embodiment of the process according to the invention, the drying of the film applied to the current collector (foil) is carried out by convective heating in a (trying oven incorporating the horizontal-float (self-supporting) technique, i.e. in a drying oven equipped with upper and lower air knives placed in series relative to one another ensuring support of the foil also called a drying tunnel.

In this case, the current collector supporting the composite film introduced into the oven is self-supported, i.e. it is held at a given height in the oven by the air knives directed alternately towards the lower surface and the upper surface of the film. These air knives are emitted by blower nozzles placed alternately on either side of the film so as to ensure the support of the sheet without any mechanical contact with the nozzles and/or the other mechanical parts of the oven. Such an oven generally consists of various individually temperature-regulated zones making it possible to give the drying air a temperature profile and to control the air speed by adjusting the blowing pressure/flow rate at the nozzles. The film passes through the oven at the rolling or calendering speed fixed for a given feed rate and a given cathode format. The water is removed from the film by forced convective heating. A dehumidification system may also be incorporated into the oven so as to dry the air entering the dryer in order to optimize the water absorbing capacity of the air. By way of example, it is especially possible to use a drying tunnel comprising a plurality of separate drying zones each a few meters in length, in which the air is heated. Generally, the temperature of the air may vary from 60° C. to 200° C., and the speed of the air blown from the nozzles is about 25 to 50 m/s in each of the zones, In each temperature zone, the airflow speed may be specifically fixed in order to remove a maximum amount of the aqueous-solvent molecules present in the film without causing its deformation and without creating porosity. Each of these zones removes an increasingly large amount of aqueous solvent until a substantially dry film is obtained, i.e. a film containing less than 1000 ppm, and more preferably less than 600 ppm of water, The drying tunnel may of course comprise a greater or lesser number of drying zones depending on its geometry and its useful length, and the temperature levels required to dry the film well.

Another subject of the invention is the positive electrode obtained according to the process described above. It is characterized in that it takes the form of a composite film in which the active electrode material is a material based on iron phosphate, preferably $LiFePO_4$, and in that:

the active electrode material content is higher than 60 wt %, preferably higher than 70 wt %, of the total weight of the electrode in the solid state;

its thickness is smaller than 100 μm, preferably smaller than 65 μm;

its porosity is lower than 3%, preferably lower than 1%; and its water content is lower than 1000 ppm, preferably lower than 600 ppm.

The electrode according to the invention may be provided in a number of widths typically varying from the smallest widths, i.e. about a centimeter, up to values possibly larger than 700 mm. Specifically, implementation of the process according to the present invention makes it possible to obtain large widths, larger than was generally possible using the known processes of the prior art, and without a detrimental alteration of the intrinsic properties of the positive electrode being observed.

Another subject of the invention is the use of a positive electrode as defined above, for manufacturing a lithium battery, in particular an LMP battery.

Finally, another subject of the invention is a lithium battery comprising at least one positive electrode, one negative electrode, an electrolyte and a current collector, characterized in that the positive electrode is an electrode such as defined above.

DETAILED DESCRIPTION

The present invention is illustrated by the following exemplary embodiment, to which it is however not limited.

EXAMPLES

Example 1

Preparation of a Positive Electrode According to the Process of the Invention

In this example, a positive electrode was produced with the process according to the invention, at a feed rate of 10 kg/h, using a corotating twin-screw extruder equipped with a number of weigh feeders one of which was connected to a side feeder, a liquid injection pump, a rework single-screw extruder coupled to a flat die, a unit for rolling the electrode onto a current collector and a drying tunnel.

Figure 1:
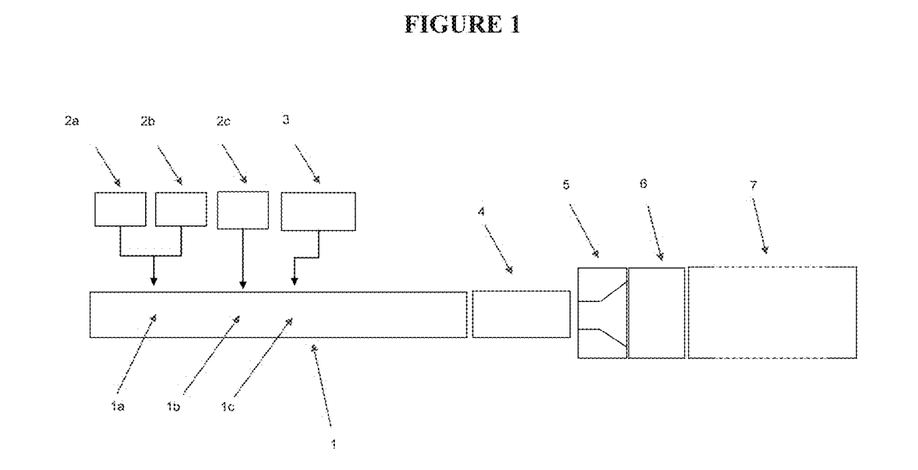
FIG. 1 shows a twin screw extruder in accordance with one embodiment.

The arrangement used is shown in annexed FIG. 1 in which a twin-screw extruder (1) 1.1 meters in length, comprising 10 zones and having a diameter of 25 mm is supplied with solid ingredients by weigh feeders (2a, 2b, 2c) and with aqueous solvent (demineralized water+LiTFSI) by a liquid, injection pump (3), the extruder (1) is coupled to a rework single-screw extruder (4) having a diameter of 30 mm, itself equipped with a flat die (5), opening onto a rolling station (6) and ending in a forced-convection drying oven (7).

The positive electrode was prepared by introducing a polyethylene oxide)/poly(butylene oxide) copolymer in the form of granules, sold under the trade name HQSEB by Dai-Ichi Kogyo Seiyaku (DKS), into the feeder (2a), introducing high-specific-surface-area carbon particles sold under the trade name Ketjen Black EC-600 JD by AkzoNobel into the feeder (2b), and introducing LiFePO$_4$ particles into the feeder (2c) connected to the side feeder. The feed rates of the weigh feeders were adjusted so as to obtain, after mixing in the extruder and before drying, an extruded composite containing 16.4 wt % of polymer, 1.3 wt % of carbon particles and 65.1 wt % of LiFePO$_4$. The contents of feeders (2a), (2b) and (2c) were introduced in succession into the twin-screw (1a and 1b). Demineralized water containing 30 wt % of LiTFSI was also introduced by means of the liquid injection pump (3) into the twin-screw (1c), in a sufficient amount to obtain, after all the ingredients had been mixed in the twin-screw of the extruder (1), an extruded composite containing 10 wt % of water. The total dry feed rate was adjusted to 10 kg/h, i.e. a feed rate of about 11.1 kg/h taking account of the weight of injected water. The extrusion was carried out at a temperature of 80° C. while the twin-screw was rotated at about 220 rpm. The composite resulting from the extrusion was then reworked by the rework single-screw (4) at a rate of 25 rpm and at a temperature of 80° C. and delivered to the flat die (5) before the final step of rolling (6) in which the extruded mixture was rolled onto a current collector consisting of an aluminum foil 15 μm in thickness coated on each face with an electrically conductive protective lacquer having a thickness of 2 μm and made of 30 wt % of acetylene black and 70 wt % of polyvinylidene fluoride/hexafluoropropylene (PVDF-HFP) at a rolling rate of 4.5 m/min. The film of extruded material applied to the current collector was then dried in line, so as to remove the water, by passing it through a forced-convection drying oven (7) 6 meters in useful length with a flow rate of drying air (dew point −30° C.) of about 120 m$^3$/h flowing counter currently at a temperature of 130° C.

Thus a positive electrode was obtained, deposited directly on a current collector, said electrode taking the form of a thin composite film having a thickness of 62±2 μm, a porosity tower than 1.5%, a width of 250±1 mm and a water content lower than 600 ppm.

Figure 2:
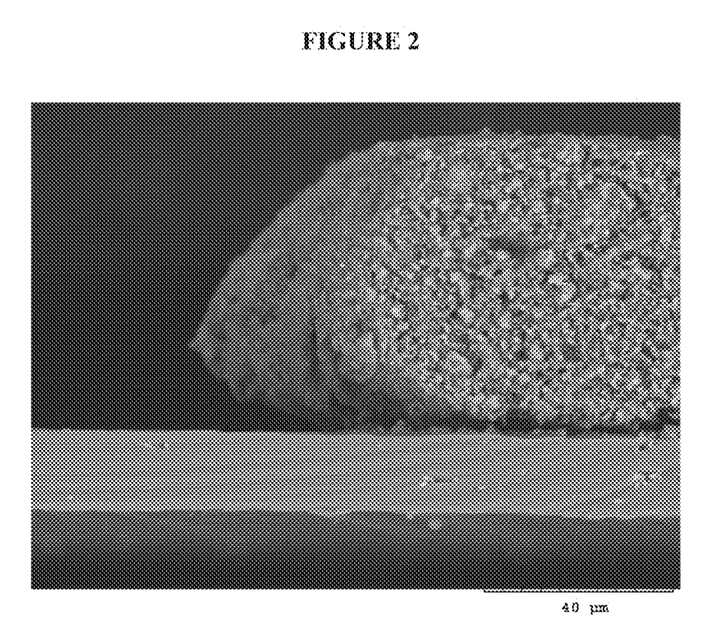
FIG. 2 is a scanning electron microscope (SEM) miscrograph showing the electrode film of Exhibit 1 in accordance with one embodiment.

A scanning electron microscope (SEM) micrograph is shown in annexed FIG. 2 (1000× magnification).

This micrograph shows that the electrode film has high-quality edges and a uniform thickness.

Moreover, and in order to check the absence of degradation of the polymer used in the preparation of the electrode, measurements of viscosity in solution were carried out on the HQSEB polymer before extrusion. The steps of the operating procedure included dissolving the polymer in the presence of lithium salt in water at 1 wt % (18 h at 40° C. with gentle stirring in a water bath), filtering with "Durieux® ash-free rapid-filtration" filter paper and measuring the kinematic viscosity in a Schott® viscometer consisting of a Ubbelohde capillary tube (Ic series, calibrated K~0.03) placed in a thermostatic bath (model Schott® CT32) at 30° C. on a base equipped with optical sensors connected to a timer (Schott® Geräte-type AVS 310) allowing the descent time of a precise specific volume of the solution through the capillary tube of known specific diameter to be measured with precision. The viscosity was derived from the mixing time using Poiseuille's law. A viscosity of 7±0.1 mm$^2$/s was obtained before extrusion. The same analysis was carried out on polymer sampled from the extruded cathode film, after a first step of dissolving the cathode (18 h at 40° C. with gentle stirring in a water bath) to finally obtain a solution of 1 wt % of polymer, a second step of separating the fillers (active material and carbonaceous load) by centrifuge (20 minutes at 350 rpm) and a filtering step (with Durieux® filter paper) being carried out before the solution was introduced into the Ubbelohde tube.

A viscosity of 6.8±0.1 mm$^2$/s was obtained after extrusion, thereby demonstrating that the extrusion process according to the invention does not degrade the polymer of the composition of the mixture used to manufacture the electrode.

Example 2

Preparation of a Positive Electrode According to the Process of the Invention

In this example, a positive electrode was produced with the process according to the invention, at a feed rate of 100 kg/h, using a corotating twin-screw extruder equipped with a number of weigh feeders one of which was connected to a side feeder, a liquid injection pump, a rework single-screw extruder coupled to a flat die, a unit for rolling the electrode onto a current collector and a drying tunnel.

The arrangement used is similar to that of example 1.

The positive electrode was prepared by introducing a poly(ethylene oxide)/poly(butylene oxide) copolymer in the form of granules, sold under the trade name HQSEB by Dai-Ichi Kogyo Seiyaku (DKS), into the feeder (2a), introducing high-specific-surface-area carbon particles sold under the trade name Ketjen Black EC-600 H) by AkzoNobel into the feeder (2b), and introducing LiFePO$_4$ particles into the feeder (2c) connected to the side feeder. The feed rates of the weigh feeders were adjusted so as to obtain, after mixing in the extruder and before drying, an extruded composite containing 16.4 wt % of polymer, 1.3 wt % of carbon particles and 65.1 wt % of LiFePO$_4$. The contents of the feeders (2a), (2b) were introduced in succession into the twin-screw extruder by gravity (1a and 1b), The contents of the feeder 2c were introduced into the twin-screw via a side feeder. Demineralized water containing 15 to 40 wt % of LiTFSI was also introduced by means of the liquid injection pump (3) into the twin-screw (1c), in a sufficient amount to obtain, after all the ingredients had been mixed in the twin-screw of the extruder (1), an extruded composite containing 8 to 16 wt % of water. The total dry feed rate was adjusted to 100 kg/h, i.e. a feed rate of about 108 to 119 kg/h taking account of the weight of injected water. The extrusion was carried out at a temperature of 65° C. while the twin-screw was rotated at about 180 rpm. The composite resulting from the extrusion was then reworked by the rework single-screw extruder (4) at a rate of 24 rpm and at a temperature of 65° C. and delivered to the flat die (5) before the final step of rolling (6) in which the extruded mixture was rolled onto a current collector consisting of aluminum 12 μm in thickness and coated with a electrically conductive protective lacquer 2 μm in thickness on each face, the lacquer being identical to that described in example 1 above, at a rolling rate of 35 m/min. The film of extruded material applied to the current collector was then dried, so as to remove the water, by passing it through a horizontal-float drying tunnel (7) having a length of between 30 and 50 m and upper and lower nozzles blowing air at speeds of 30 to 60 m/s and applying temperatures of 60 to 180° C., depending on the position of the zones.

Thus a positive electrode was obtained, deposited directly on a current collector, said electrode taking the form of a thin composite film having a thickness of 52±2 μm (sample measured in a laboratory using a Mitutoyo® profilometer), a porosity tower than 2.5%, a width of 380±1.5 mm and a water content lower than 600 ppm.

An in-line thickness measurement that was zeroed on the current collector system in order to measure the thickness of the first cathode face post drying confirmed the average thickness to be 52 μm±2 μm. The in-line thickness measurement was carried out by a Keyence® LS 7030 travelling optical device (transverse travel in order to analyze the complete width) employing a set of LEDs.

The porosity was measured by the conventional mass/volume technique allowing the true density of the product to be derived—measurements carried out with a Micromeritics AccuPyc 1330 helium pycnometer confirmed the small porosity values. Actual density measurements performed prove the low porosity level of the final product. SEM observations of the surface and edge face (not shown) allowed these properties to be confirmed. Pores were not observed, on the surface, and voids were not seen in the samples examined.

An in-line defect detection system (Aviiva® SM2 4096-pixel, high-definition linear camera with Incore Systems® software) also made it possible, throughout production, to monitor the quality of the film (absence of foreign bodies, scratches, pores, etc.) and to control in line the width of the cathode and the collector edges. The average value 380±1.5 mm was measured by this measurement system.

The second cathode face was extruded and processed with the same parameters on the free face of the above system {current collector/cathode/first face}. A current collector coated with a positive-electrode film on each face was thus obtained, having a total thickness of 120±4 μm (including both cathode faces, the current collector and its protective layers), a porosity lower than 1.5%, a width of 380±1.5 mm and a water content lower than 500 ppm. An in-line thickness measurement that this time zeroed on the first current collector/cathode system in order to measure the specific thickness of the second cathode face post drying returned an average statistical thickness of 52 μm±2 μm.

Example 3

Preparation of a Lithium Battery

In this example a lithium battery was produced containing:
the positive electrode manufactured in example 2 above;
an electrolyte consisting of a bilayer film as described in patent application FR-A-2 881 275, i.e. a film consisting of a first 10 μm-thick film in contact with the cathode and containing, by weight, 38% of polyoxyethylene (POE), 53% of PVDF/HFP, 9% of LiTFSI and a second 10 μm-thick film in contact with the lithium and containing 70% of POE, 22% of PVDF/FIFP, 17.8% of LiTFSi and 10% of MgO;
a lithium film having a thickness of 70 μm, as a negative electrode; and
an aluminum current collector.
Winding was used to join these elements.

The battery was made to operate in a C/2 discharge regime and a C/4 charge regime, by applying a voltage of between 3.6 V and 2.5 V to its terminals.

The voltage=f(capacity) charts obtained. (not shown) were normal and showed no process-related defects.

The lifetime measured was 1308 cycles (end-of-life corresponding to a loss of 20% of the initial capacity of the battery) which is much higher than the target set of 1000 cycles.

It therefore seems that employing the process for preparing a positive-electrode film in accordance with the invention does not cause the performance of batteries using this film to deteriorate.

The invention claimed is:

1. A process for producing a positive electrode including an active positive-electrode material of $LiFePO_4$,
said active positive-electrode material made from a composite having:
at least one water-soluble polymer that conducts ions in the presence of a lithium salt;
at least one lithium salt; and
optionally at least one material providing electrical conduction properties,
said process comprising the steps of:
(1) mixing, by extrusion, the ingredients of the composite so as to obtain an extruded composite;
(2) forming the composite extruded through a die;
(3) rolling or calendering the extruded composite into the form of a positive electrode film on a current collector; and,
(4) drying the positive-electrode film applied to the current collector,
wherein the extrusion step is carried out via an extruder in the presence of an aqueous solvent,
said aqueous solvent having any one of
(a) demineralized water,
(b) distilled water or
(c) a mixture of demineralized or distilled water and at least one water-miscible solvent representing at most 30 wt % of the total weight of the aqueous solvent,
said aqueous solvent representing approximately from 3 to 25 wt % of the total weight of the ingredients forming the composite, and
at a temperature from 20 to 95° C.,
wherein the water-soluble polymer is selected from the group consisting of polyoxyethylene, polyoxypropylene, polyoxybutylene, polyoxyethylene-based copolymers, polyoxypropylene-based copolymers, polyoxybutylene-based copolymers, polyoxyethylene based terpolymers, polyoxypropylene-based terpolymers, and polyoxybutylene-based terpolymers,
wherein the lithium salt is selected from the group consisting of LiTFSI, $LiClO_4$ and LiBETI, and
wherein said aqueous solvent is of a composition that is sufficient to reduce the viscosity of the composite so that it is extruded below 95° C. such that said positive electrode film includes at least 60% active material while the positive-electrode film being 100μm or less in thickness.

2. The process as claimed in claim 1, wherein the extrusion step is carried out at a temperature from 35 to 80° C.

3. The process as claimed in claim 1, wherein the extrusion step is carried out by means of a. twin-screw extruder.

4. The process as claimed in claim 3, wherein the twin-screw extruder is a corotating twin-screw extruder.

5. The process as claimed in claim 4, wherein the twin-screw extruder comprises a sectional, modular barrel of about ten blocks in succession, each block being individually controlled to a specific selected temperature and in Which blocks two parallel screws rotate, a variable-speed gearmotor driving the screws, one or more variable feed rate supply devices intended to supply the extruder with the ingredients making up the composition of the electrode composite, a system for introducing the liquid aqueous solvent, and optionally one or more side feeders, said twin-screw extruder furthermore being equipped with multiple hoppers, with one or more specific barrel assemblies dedicated to the optional connection of one or more liquid injection nozzles, and optionally with one or more barrel assemblies intended to receive the one or more connections of a side feeder.

6. The process as claimed in claim 1, wherein the water-miscible solvent is chosen from methanol, ethanol, propanol, butanol and glycols.

7. The process as claimed in claim 1, wherein when it is present, the water-miscible solvent represents less than least 15 wt % of the total weight of the aqueous solvent.

8. The process as claimed in claim 1, wherein the amount of aqueous solvent used in the extrusion step varies from 8 to 15 wt % of the total weight of the ingredients forming the composite.

9. The process as claimed in claim 1, further comprising a device for increasing and stabilizing pressure is positioned at the outlet of the extruder, in front of the die.

10. The process as claimed in claim 9, wherein said device is a single-screw rework extruder having a temperature profile of 20 to 95° C.

11. The process as claimed in claim 1, wherein the die is a flat die.

12. The process as claimed in claim 1, wherein the rolling or calendering step is carried out in rolling or calendering equipment of two rollers that rotate in opposite directions.

13. The process as claimed in claim 1, wherein the drying step is carried out in line.

14. The process as claimed in claim 1, wherein the active positive-electrode material, the water-soluble polymer and the material providing electrical conduction properties are each contained in different feeders and introduced, in succession and/or simultaneously, into zones of the extruder, downstream or upstream of the zone for introducing the aqueous solvent.

15. The process as claimed in claim 1, wherein the aqueous solvent is injected directly into the extruder, by means of a liquid injection pump.

16. The process as claimed in claim 1, wherein the extrusion is carried out at a feed rate of 2 to 200 kg of the mixture of the ingredients (solid content) of the composition of the electrode material per hour.

17. The process as claimed in claim 1, wherein the active electrode material is $LiFePO_4$ in the form of uncoated particles or particles comprising a carbonaceous coating.

18. The process as claimed in claim 1, wherein the active electrode material represents approximately 60 to 85 wt % of the total weight of the ingredients of the composition of the composite in the solid state.

19. The process as claimed in claim 1, wherein the water-soluble polymer takes the form selected from the group consisting of a powder, of granules and an aqueous dispersion.

20. The process as claimed in claim 1, wherein the water-soluble polymer represents from 10 to 30 wt % of the total weight of the ingredients of the composition of the composite in the solid state.

21. The process as claimed in claim 1, wherein the material providing electrical conduction properties is carbon and is selected from the group consisting of carbon blacks, carbon nanotubes, graphite and mixtures of these materials.

22. The process as claimed in claim 1, wherein the material providing electrical conduction properties is an aqueous dispersion of carbon black or of graphite.

23. The process as claimed in claim 1, wherein the final content of lithium salt varies from 3 to 10 wt % of the total weight of the electrode composite after drying of the film.

24. The process as claimed in claim 1, wherein the aqueous solvent used in the extrusion step contains said lithium salt in solution.

25. The process as claimed in claim 1, wherein the rolling or calendering step is carried out directly on at leas one of the two faces of a current collector, via action on the composite as it is extruded from the die.

26. The process as claimed in claim 1, wherein the current collector for the positive electrode is an aluminum foil having a thickness ranging from 4 μm to 30 μm.

27. The process as claimed in claim 1, wherein the step of drying the film applied to the current collector is carried out by convective heating in a drying oven.

28. The process as claimed in claim 1, wherein the extrusion step is carried out by a co-kneader extruder.

29. The process as claimed in claim 1, wherein the extrusion step is carried out by a multi-screw extruder.

30. The process as claimed in claim 27, wherein the drying oven is a horizontal-float.

* * * * *